United States Patent [19]
Kida et al.

[11] Patent Number: 5,695,266
[45] Date of Patent: Dec. 9, 1997

[54] PROJECTION-TYPE DISPLAY APPARATUS

[75] Inventors: Hiroshi Kida; Shinsuke Shikama; Akira Daijogo; Shinji Okamori, all of Tokyo, Japan

[73] Assignee: Mitsubishi Denki Kabushiki Kaisha, Tokyo, Japan

[21] Appl. No.: 598,916

[22] Filed: Feb. 9, 1996

[30] Foreign Application Priority Data

Feb. 16, 1995 [JP] Japan .................................. 7-028275
Jan. 24, 1996 [JP] Japan .................................. 8-009870

[51] Int. Cl.⁶ .................................................. G03B 21/14
[52] U.S. Cl. ........................... 353/31; 353/34; 353/37; 353/97
[58] Field of Search .......................... 353/31, 34, 37, 353/38, 97; 359/40, 48, 49; 349/5, 7, 8

[56] References Cited

U.S. PATENT DOCUMENTS

| | | | |
|---|---|---|---|
| 4,864,390 | 9/1989 | McKechnie et al. | 353/34 |
| 4,943,154 | 7/1990 | Miyatake et al. | 353/31 |
| 5,060,058 | 10/1991 | Goldenberg et al. | 353/34 |
| 5,264,879 | 11/1993 | Shikama | 353/31 |
| 5,371,559 | 12/1994 | San-Nohe et al. | 353/31 |
| 5,379,083 | 1/1995 | Tomita | 353/122 |
| 5,488,436 | 1/1996 | Choi et al. | 353/34 |
| 5,519,518 | 5/1996 | Watanabe | 359/49 |

FOREIGN PATENT DOCUMENTS

| | | |
|---|---|---|
| 53221 | 3/1991 | Japan . |
| 6-324401 | 11/1994 | Japan . |

Primary Examiner—William Dowling

[57] ABSTRACT

A projection-type display apparatus comprising a lamp, an ellipsoidal mirror, a diaphragm disposed in the vicinity of a secondary focus of the ellipsoidal mirror, a first color separating dichroic mirror for separating the light into a blue color beam and a beam having a wavelength outside the blue wavelength region, a second color separating dichroic mirror for separating the beam having the wavelength outside the blue wavelength region into a red color beam and a green color beam, light valves for displaying images respectively corresponding to the red, green and blue color beams, first lens for making the red, green and blue color beams respectively advancing toward the respective light valves into parallel or convergent beams, color synthesizing dichroic mirrors for synthesizing the red, green and blue color beams which have been transmitted through the respective light valves, and a projection lens for enlarging and projecting a synthesized beam onto a screen. The first lens is disposed downstream in a light propagation direction from the first color separating dichroic mirror.

20 Claims, 18 Drawing Sheets 5,695,266

PROJECTION-TYPE DISPLAY APPARATUS

BACKGROUND OF THE INVENTION

The present invention relates to a projection-type display apparatus for projecting an image on a screen, and in particular to making an optical system of the apparatus more compact.

Conventional projection-type display apparatuses are, for example, disclosed in Japanese Patent Kokai Publications No. 53221/1991 and No. 324401/1994. In the apparatuses shown in these publications, an ellipsoidal mirror and condenser lenses are used for obtaining parallel beam which impinges on light valves. Since the illuminating optical system using the ellipsoidal mirror can vary the degree of collimation of the beam simply by varying an aperture of a diaphragm, it is suitable for a projection-type display apparatus using a scattering mode liquid crystal light valve.

However, in the conventional apparatuses using the ellipsoidal mirror and condenser lenses, since the light from the lamp is focused in the vicinity of the secondary focus of the ellipsoidal mirror and the converged light is made into parallel beam by a lens having a long focal length, the optical path from the lamp to the condenser lens has to be made long. This makes the optical system larger so that the whole apparatus became bulkier and heavier.

If a parabolic mirror is used instead of the ellipsoidal mirror and condenser lenses, the beam is highly converged and the optical system is simplified, however, aberration increases and the degree of collimation is lower when using a lamp having a large light-emitting area.

Further, if a spherical mirror and condenser lenses are used instead of the ellipsoidal mirror and condenser lenses, the optical system is comparatively smaller but the converging performance is then low.

SUMMARY OF THE INVENTION

It is therefore an object of the present invention to provide a compact, lightweight projection-type display apparatus giving a bright projected image with low light losses.

A projection-type display apparatus according to the present invention comprises a lamp for emitting light, an ellipsoidal mirror for converging the light emitted by the lamp, a diaphragm disposed in the vicinity of a secondary focus of the ellipsoidal mirror, a first color separating dichroic mirror for separating the light transmitted through an aperture of the diaphragm into a first beam having a wavelength within a first wavelength region and a beam having a wavelength outside the first wavelength region, and a second color separating dichroic mirror for separating the beam having the wavelength outside the first wavelength region into a second beam having a wavelength within a second wavelength region and a third beam having a wavelength outside the second wavelength region. The apparatus further comprises first, second and third light valves for displaying images respectively corresponding to the first, second and third beams, first lenses for making the first, second and third beams respectively incident on the first, second and third light valves into parallel or convergent beams, color synthesizing dichroic mirrors for synthesizing the first, second and third beams which have been transmitted through the first, second and third light valves respectively, thereby generating a synthesized beam, and a projection lens for enlarging and projecting the synthesized beam onto a screen. Each first lens is disposed downstream in a light propagation direction from the first color separating dichroic mirror.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

First Embodiment

Figure 1:
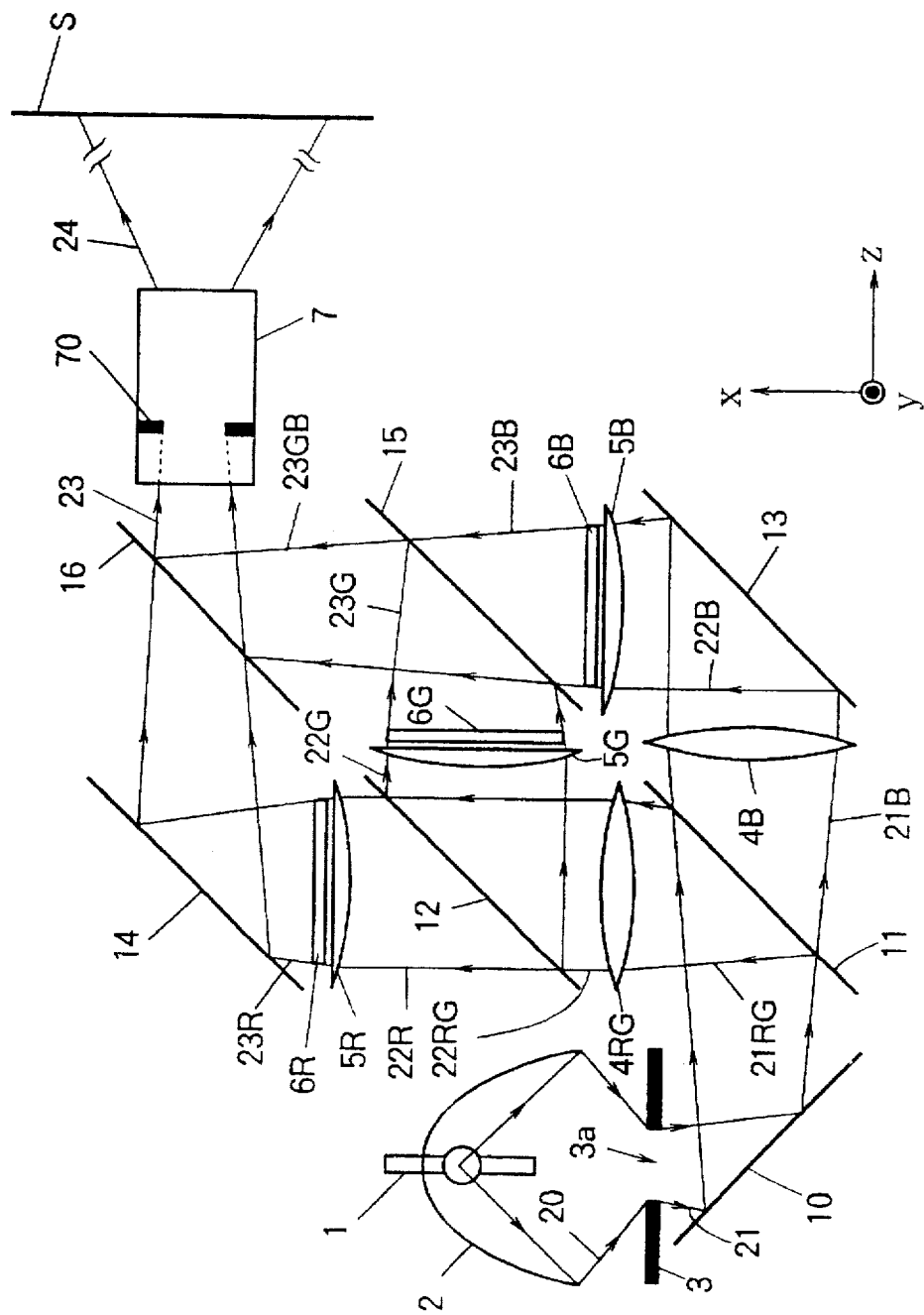
FIG. 1 is a schematic view showing an optical system of a projection-type display apparatus according to a first embodiment of the present invention.

FIG. 1 is a schematic view showing an optical system of a projection-type display apparatus according to a first embodiment of the present invention. The projection-type display apparatus according to the first embodiment comprises a lamp 1 for emitting white light, an ellipsoidal mirror 2 for converging the light emitted by the lamp 1, a diaphragm 3 disposed in the vicinity of the secondary focus of the ellipsoidal mirror 2, and a reflecting mirror 10 for changing the propagation direction of a divergent beam 21 transmitted through an aperture 3a of the diaphragm 3. The lamp 1 may, for example, be a high brightness white light source such as a metal halide lamp, xenon lamp or halogen lamp, and it is disposed such that the light emitting center of the lamp 1 is situated near the primary focus of the ellipsoidal mirror 2. The reflecting mirror 10 is used to make the apparatus more compact, and it is desirably a cold mirror which transmits infrared and ultraviolet light and reflects only visible light so as to eliminate unwanted light.

The projection-type display apparatus according to the first embodiment further comprises, for example, a first color separating dichroic mirror 11 which transmits the blue light component but reflects the red and green light components (i.e., the light components other than the blue light component), a condenser lens 4B which converts a divergent blue beam 21B transmitted through the first color separating dichroic mirror 11 into a parallel blue beam 22B, a condenser lens 4RG which converts a divergent beam 21RG reflected by the first color separating dichroic mirror 11 into a parallel beam 22RG, and a second color separating dichroic mirror 12 which separates the parallel beam 22RG into a parallel red beam 22R and a parallel green beam 22G. According to the first embodiment, the condenser lenses 4RG and 4B are convex lenses made of glass or plastic.

The projection-type display apparatus according to the first embodiment further comprises a condenser lens 5R which converges the parallel red beam 22R transmitted through the second color separating dichroic mirror 12, a liquid crystal light valve 6R which displays an image for the color red, a reflecting mirror 14 which changes the propagation direction of a red beam 23R transmitted through the liquid crystal light valve 6R, a condenser lens 5G which converges the green beam 22G reflected by the second dichroic mirror 12, a liquid crystal light valve 6G which displays an image for the color green, a reflecting mirror 13 which changes the propagation direction of the parallel blue beam 22B transmitted through the first color separating dichroic mirror 11, a condenser lens 5B which converges the reflected blue beam 22B, and a liquid crystal light valve 6B which displays an image for the color blue. Herein, the condenser lenses 5R, 5G and 5B are convex lenses made of glass or plastic. The condenser lenses 5R, 5G and 5B are components intended to efficiently transmit light through an entrance pupil 70 of a projection lens 7 to be described hereinafter, and provided the design is such that the entrance pupil 70 of the projection lens 7 is located at the focal points of the condenser lenses 5R, 5G and 5B, they may be also be situated after the light valves 6R, 6G and 6B (i.e., downstream from the liquid crystal light valves in the light propagation direction). The liquid crystal light valves 6R, 6G and 6B comprise an orderly array of picture elements which are the minimum unit of display, and a voltage is applied independently to each picture element to vary the optical properties of the liquid crystals so as to display an image. In order to drive each picture element independently, a simple matrix technique or an active matrix technique with switching devices such as TFTs may be used. The liquid crystals of the light valves may be TN crystals or STN crystals which control the optical rotatory power of linearly polarized light, or scattering-type liquid crystals such as LCPC (Liquid Crystal and Polymer Composite) or DSM (Dynamic Scattering Mode) crystals which control the light scattering power. Since the scattering-type liquid crystals do not require a polarizing plate, a brighter projected image can be obtained. Low cost aluminum mirrors without any wavelength selectivity may be used for the reflecting mirrors 13 and 14, however, mirrors are preferable to be provided with coating for increasing reflectivity.

The projection-type display apparatus according to the first embodiment further comprises a first color synthesizing dichroic mirror 15 which, by transmitting a blue beam 23B which has passed through the liquid crystal light valve 6B and reflecting a green beam 23G which has passed through the liquid crystal light valve 6G, synthesizes the blue beam 23B with the green beam 23G so as to form a synthesized beam 23GB, a second color synthesizing dichroic mirror 16 which reflects the synthesized beam 23GB and transmits the red beam 23R which has passed through the liquid crystal light valve 6R, and the projection lens 7 which converts a synthesized beam 23 to a projecting beam 24 and projects it on a screen S.

Since the spectral properties of the dichroic mirrors depend on incident angle of the beam and the incident angles vary from place to place on a surface of the dichroic mirrors, it is expedient to provide wedge filters near the color synthesizing dichroic mirrors 15 and 16 disposed in the optical path of convergent beams and the color separating dichroic mirror 11 disposed in the optical path of divergent beams. The filters ensure identical spectral characteristics when incident positions and angles are different, and are effective in obtaining a projected image having highly uniform chromaticity.

The image display areas of the liquid crystal light valves 6R, 6G and 6B are generally rectangular, the ratio of the vertical to the horizontal sides being 3:4 or 9:16 (i.e., aspect ratio is 4:3 or 16:9). The liquid crystal light valves 6R, 6G and 6B may be disposed either with the long side of the image display area parallel to the xz plane in FIG. 1 (i.e., the short side of the image display area parallel to the y axis in FIG. 1), or with the short side of the image display area parallel to the xz plane in FIG. 1 (i.e., the long side of the image display area parallel to the y axis in FIG. 1).

As described above, according to the first embodiment, the condenser lenses 4RG and 4B which render the beams 22R, 22G and 22B respectively incident on the liquid crystal light valves 6R, 6G and 6B parallel, are disposed downstream in the propagation direction of the beams 21B and 21RG from the first color separating dichroic mirror 11. The distance (optical path) which must be provided between the lamp 1 and the condenser lenses 4RG and 4B, and the optical path of the color separating optical system including the color separating dichroic mirror 11, are therefore shared. This reduces the volume of the optical system by the amount of the shared area, and makes the whole apparatus more compact and lightweight.

If UV/IR (ultraviolet and infrared) cut filters that transmit only visible light are placed in the optical path from the lamp 1 to the liquid crystal light valves 6R, 6G and 6B, deterioration of the liquid crystals due to ultraviolet or infrared light may be avoided.

If the short sides of the image display areas of the liquid crystal light valves are disposed parallel to the xz plane in FIG. 1, the effective surface area of the dichroic mirrors 11, 12, 15 and 16 and reflecting mirrors 13 and 14 which are inclined to the liquid crystal light valves 6R, 6G and 6B (at 45 degrees as shown in FIG. 1) may be designed smaller which makes the optical system more compact, the back focal length of the projection lens 7 is shorter, and design is easier.

Figure 2:
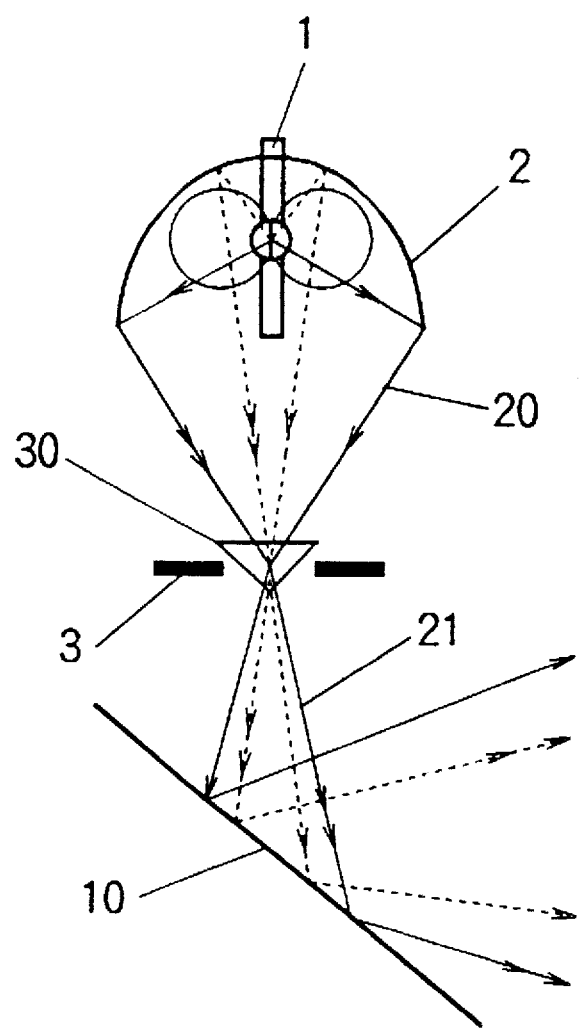
FIG. 2 is a schematic view showing another aspect including a conical lens according to the first embodiment.

If an optical component such as a conical or pyramid-shaped lens 30 is disposed in the vicinity of the secondary focus of the ellipsoidal mirror 2 as shown in FIG. 2, an illuminating beam having uniformity of illumination and a high degree of collimation is obtained which has excellent convergence on the entrance pupil 70. In a projection-type display apparatus using scattering-type liquid crystals, if an arrangement is adopted whereby the aperture of the diaphragm 3 of the illumination optical system can be varied according to the diameter of the entrance pupil 70 of the projection lens 7, a high contrast image which always has high visibility and brightness is obtained. The projection-type display apparatus of the first embodiment is moreover effective when used with liquid crystal light valves provided with microlenses which require highly convergent illumination by the lenses (for example, in the apparatus disclosed in Japanese Kokai Publication No. 53221/1991).

Second Embodiment

Figure 3:
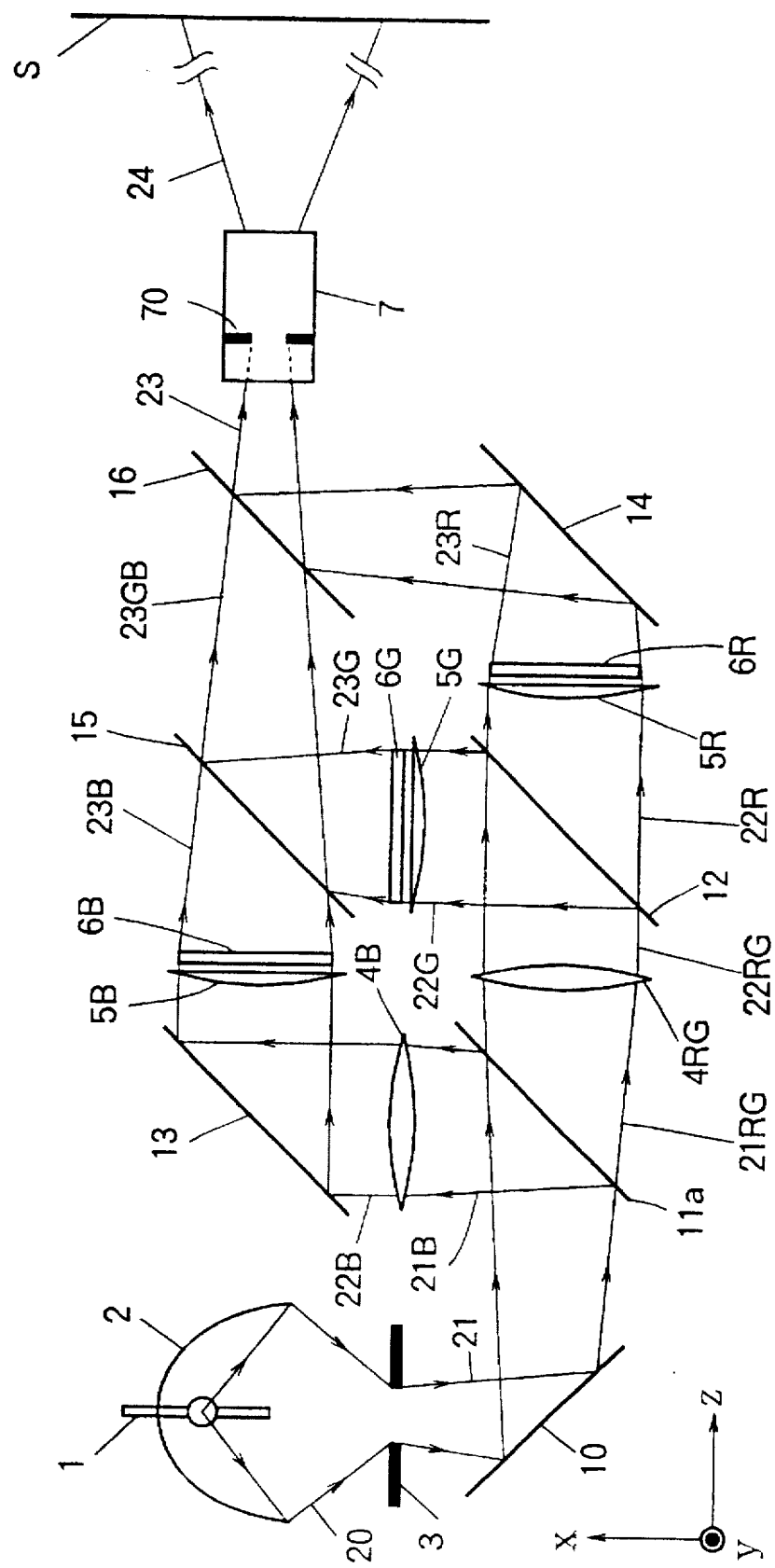
FIG. 3 is a schematic view showing an optical system of a projection-type display apparatus according to a second embodiment of the present invention.

FIG. 3 is a schematic view showing an optical system of a projection-type display apparatus according to a second embodiment of the present invention. In FIG. 3, the construction which are identical or corresponding to those of FIG. 1 are denoted by the same symbols. The projection-type display apparatus of the second embodiment differs from that of the first embodiment (FIG. 1) in the characteristic of the first color separating dichroic mirror 11a and the arrangement of components.

The first color separating dichroic mirror 11 of the above-mentioned first embodiment transmits the blue component of the light and reflects the red and green components (i.e., the components other than blue), however, the first color separating dichroic mirror 11a of the second embodiment reflects the blue component and transmits the red and green components (i.e., the components other than blue). Also, as shown in FIG. 1, in the optical system of the above-mentioned first embodiment, two mirrors (for example, 11 and 13) are disposed in the z direction and three mirrors (for example, 11, 12 and 14) are disposed in the x direction, however, as shown in FIG. 3, in the optical system of the second embodiment, three mirrors (for example, 11a, 12 and 14) are disposed in the z direction and two mirrors (for example, 11a and 13) are disposed in the x direction. If the short sides of the liquid crystal light valves 6R, 6G and 6B are arranged parallel to the xz plane, the x direction is the height direction of the apparatus, hence the height of the apparatus can be made lower in the case of the second embodiment than in that of the above-mentioned first embodiment. The remaining points of the second embodiment are the same as those of the first embodiment.

Third Embodiment

Figure 4:
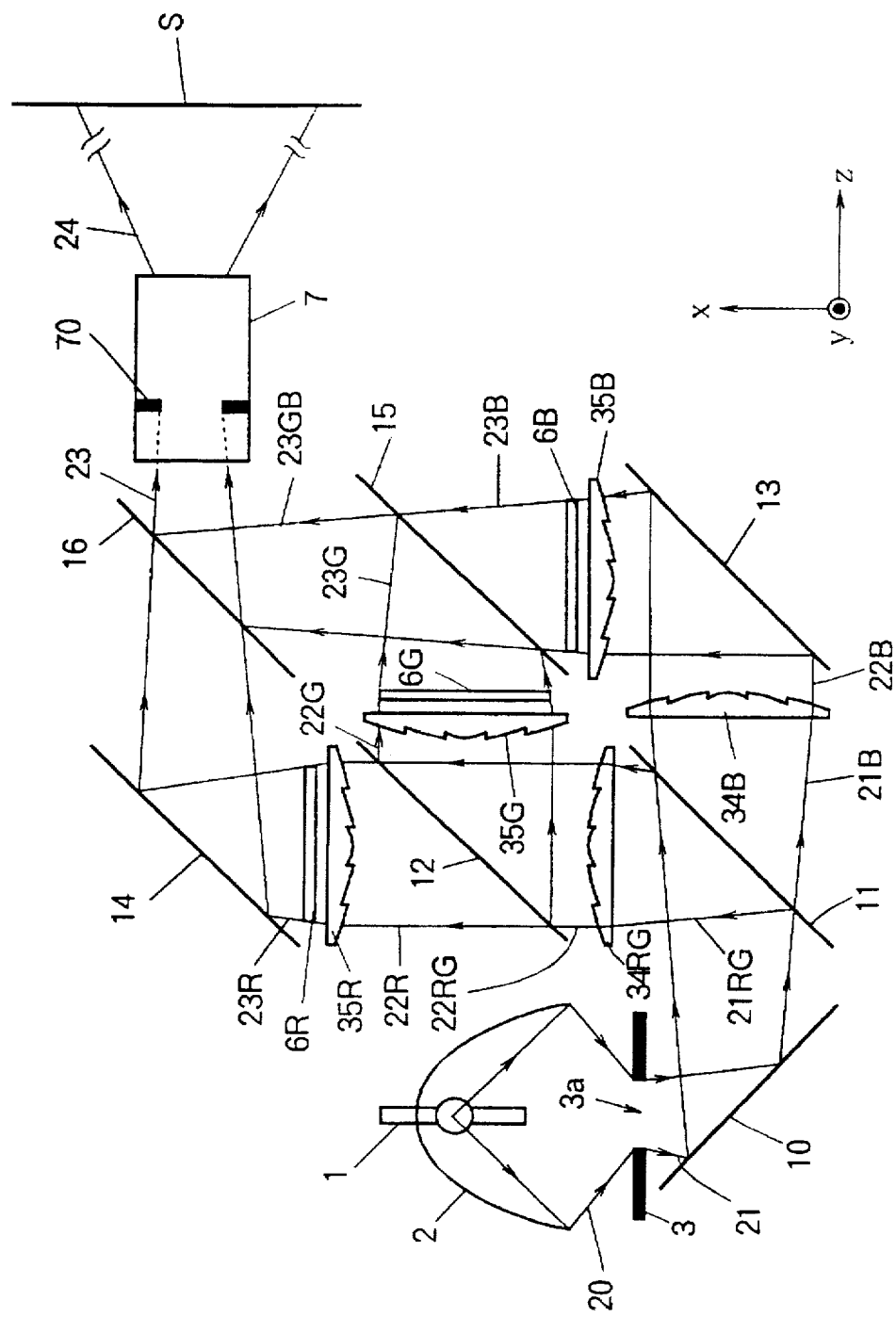
FIG. 4 is a schematic view showing an optical system of a projection-type display apparatus according to a third embodiment of the present invention.

FIG. 4 is a schematic view showing an optical system of a projection-type display apparatus according to a third embodiment of the present invention. In FIG. 4, the construction which are identical or corresponding to those of FIG. 1 are denoted by the same symbols. The projection-type display apparatus of the third embodiment differs from that of the first embodiment (FIG. 1) in that the condenser lenses 4B and 4RG of the first embodiment are respectively replaced by Fresnel lenses 34B and 34RG and that the condenser lenses 5R, 5G and 5B of the first embodiment are respectively replaced by Fresnel lenses 35R, 35G and 35B, as shown in FIG. 4.

Figure 5A:
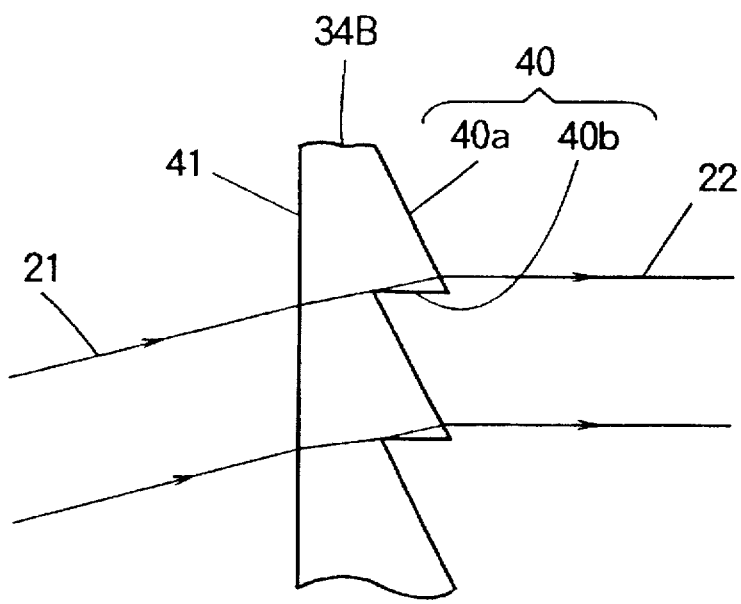
FIG. 5A is an explanatory diagram showing a function of the Fresnel lens 34B in FIG. 4.
Figure 5B:
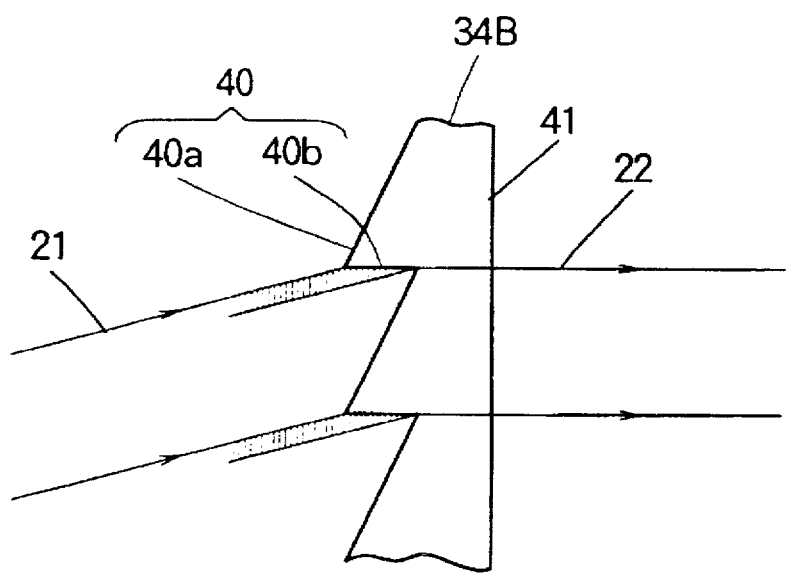
FIG. 5B is an explanatory diagram showing a problem when the Fresnel lens in FIG. 4 is disposed so as to face in an opposite direction.

The Fresnel lenses 34B and 34RG shown in FIG. 4 are made of glass or plastic, and have a flat (or curved) surface 41 and a stepped surface (Fresnel surface) 40 having ring-like or circular steps, as shown in FIG. 5A. In the third embodiment, as shown in FIG. 4 or FIG. 5A, the flat surface 41 (Although FIG. 5A shows the Fresnel lens 34B, the Fresnel lens 34RG has the same construction) faces the first color separating dichroic mirror 11. In other words, the flat surface 41 faces the divergent beam 21 (i.e., 21B and 21RG in FIG. 4), and the Fresnel surface 40 faces the parallel beam 22 (i.e., 22B and 22RG in FIG. 4). This is because if the Fresnel surface 40 is arranged facing the divergent beam 21, only the light incident on the inclined surface 40a will be rendered parallel, whereas the light incident on the boundary surface 40b will not be rendered parallel and be lost. There will also be increased aberration and a lesser degree of collimation due to the fact that the light is refracted from a divergent beam to a parallel beam by only one surface of the Fresnel lens, and this will lead to poorer convergence on the entrance pupil 70.

Figure 6A:
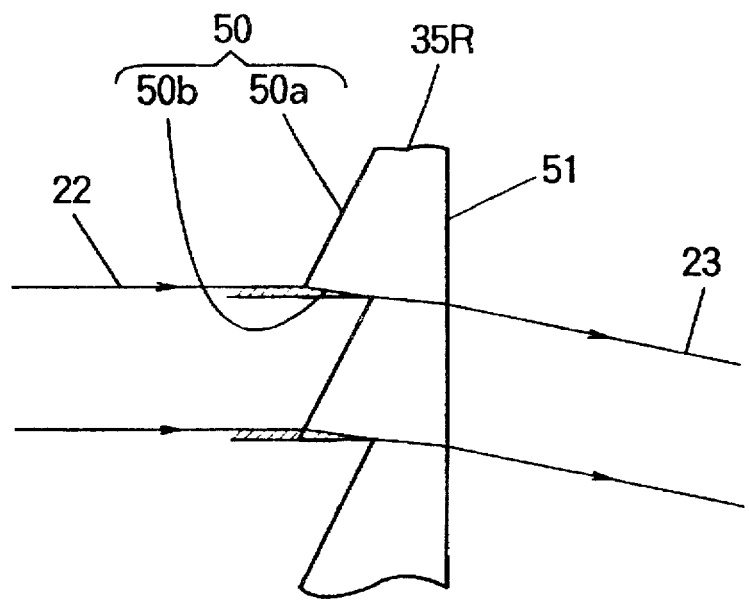
FIG. 6A is an explanatory diagram showing a function of the Fresnel lens 35R in FIG. 4.
Figure 6B:
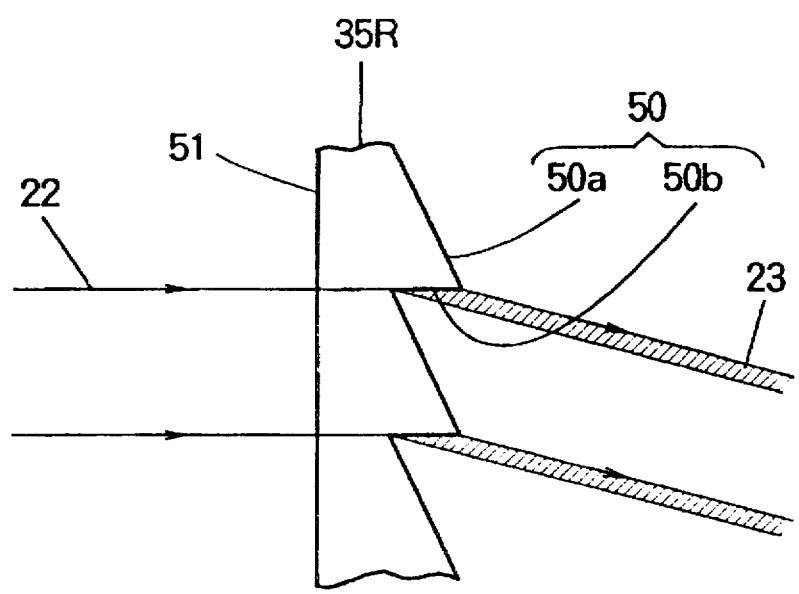
FIG. 6B is an explanatory diagram showing a problem when the Fresnel lens in FIG. 4 is disposed so as to face in an opposite direction.

The Fresnel lenses 35R, 35G and 35B in the vicinity of the liquid crystal light valves 6R, 6G and 6B shown in FIG. 4 are also made of glass or plastic, and have a flat (or curved) surface 51 and a stepped surface (Fresnel surface) 50 having ring-like or circular steps, as shown in FIG. 6A. In the third embodiment, as shown in FIG. 4 or FIG. 6A, the flat surface 51 (Although FIG. 6A shows the Fresnel lens 35R, the Fresnel lenses 35G and 35B have the same construction) faces the liquid crystal light valve 6R. In other words, the Fresnel surface 50 faces the incident parallel beam 22 (i.e., 22R, 22G and 22B in FIG. 4). This is because if the Fresnel surface 50 is arranged facing the liquid crystal light valves 6R, 6G and 6B, striped patterns (shaded area in FIG. 6B) due to the Fresnel lens will be easy to appear and be projected on the screen, as shown in FIG. 6B. In addition, the picture elements of the liquid crystal light valves 6R, 6G and 6B and the Fresnel stripes would interfere, giving rise to a Moire effect which would lead to image deterioration. In particular, when scattering-type liquid crystals are used for the light valves 6R, 6G and 6B, the F number of the projection lens 7 must be set large in order to obtain high contrast, and Fresnel stripes are even more likely to be projected.

As described hereinbefore, according to the third embodiment, the apparatus can be made more compact and lightweight for the same reasons as in the case of the above-mentioned first embodiment. Further, according to the third embodiment, the lenses can be made more compact and lightweight. If the lenses are made of plastic, low-cost lenses which are easy to mass produce can be manufactured by a technique such as compression molding or injection molding, and the cost of the apparatus can be reduced.

With regard to the Fresnel lenses 34B, 34RG and the Fresnel lenses 35R, 35G, 35B shown in FIG. 4, FIGS. 5A and 5B, and FIGS. 6A and 6B, the surfaces 41 and 51 opposite the Fresnel surfaces are flat, however, they may also be convex curved surfaces in order to increase lens power. The Fresnel surfaces 40 and 50 may also comprise steps formed on a convex surface. Further, the Fresnel lenses 34RG, 34B or the Fresnel lenses 35R, 35G, 35B may each comprise two Fresnel lenses as shown in FIG. 12 hereinafter.

When a projection lens 7 of large F number is used, it is desirable that the Fresnel pitch is made smaller than the picture element pitch of the liquid crystal light valves 6R, 6G and 6B in order to further suppress the effect of Fresnel stripes due to the Fresnel lenses 35R, 35G and 35B disposed in the vicinity of the liquid crystal light valves 6R, 6G and 6B. The remaining points of the third embodiment are identical to those of the above-mentioned first embodiment.

Fourth Embodiment

Figure 7:
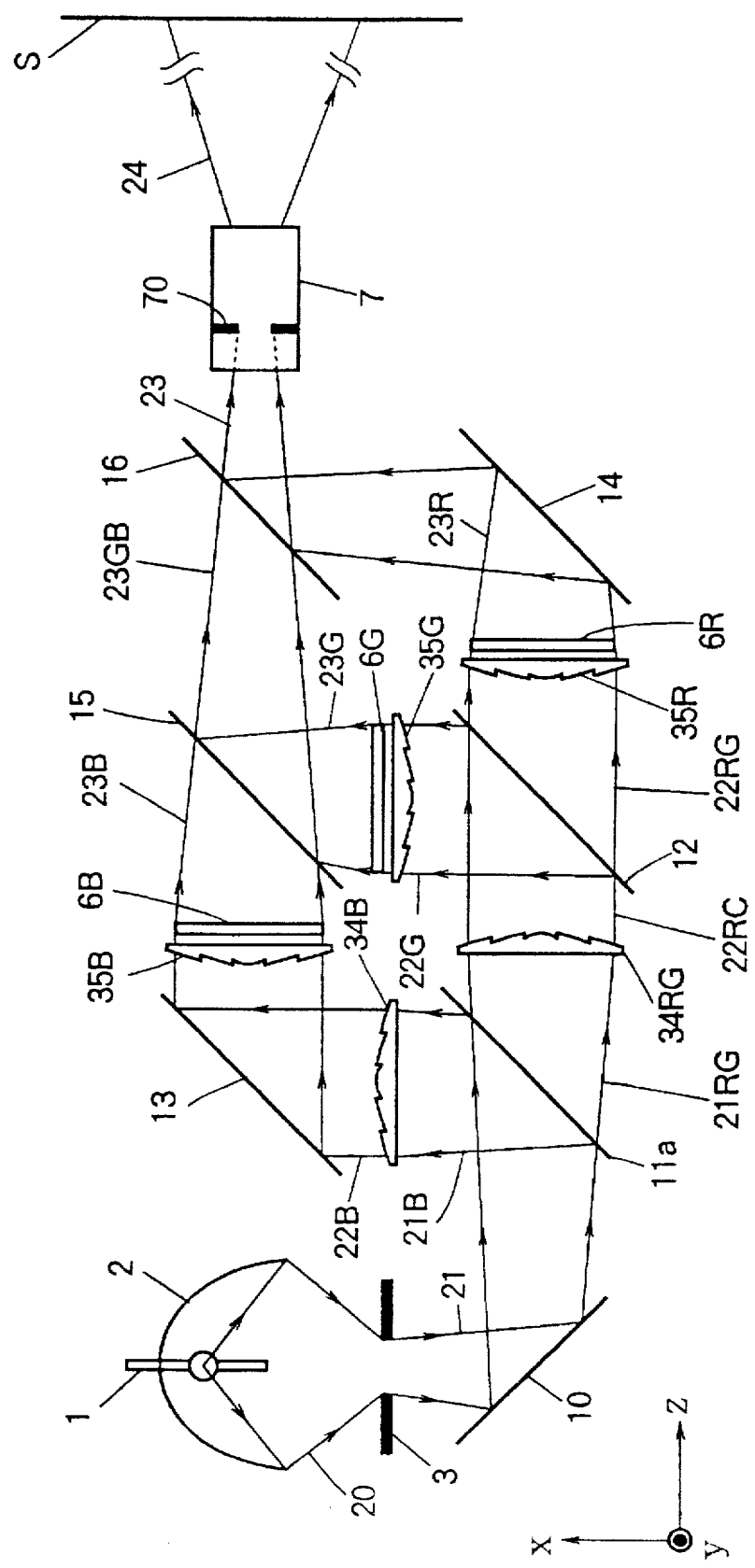
FIG. 7 is a schematic view showing an optical system of a projection-type display apparatus according to a fourth embodiment of the present invention.

FIG. 7 is a schematic view showing an optical system of a projection-type display apparatus according to a fourth embodiment of the present invention. In FIG. 4, the construction which are identical or corresponding to those of FIG. 4 are denoted by the same symbols. The projection-type display apparatus of the fourth embodiment differs from that of the third embodiment (FIG. 4) in the characteristics of the first color separating dichroic mirror 11a and the disposition of the components.

The first color separating dichroic mirror 11 of the above-mentioned third embodiment transmits the blue component of the light and reflects the red and green components (i.e., the components other than blue), however, the first color separating dichroic mirror 11a of the fourth embodiment reflects the blue component of the light and transmits the red and green components (i.e., the components other than blue). Also, in the optical system according to the above-mentioned third embodiment, the two mirrors (for example, 11 and 13) are disposed in the z direction and the three mirrors (for example, 11, 12 and 14) are disposed in the x direction as shown in FIG. 4, however, in the optical system of the fourth embodiment, the three mirrors (for example, 11a, 12 and 14) are disposed in the z direction and the two mirrors (for example, 11a and 13) are disposed in the x direction, as shown in FIG. 7. If the short sides of the image display areas of the liquid crystal light valves 6R, 6G and 6B are arranged parallel to the xz plane, the x direction is the height direction of the apparatus, hence the height of the apparatus can be made lower in the case of the fourth embodiment than in that of the above-mentioned third embodiment. The remaining points of the fourth embodiment are the same as those of the third embodiment.

Fifth Embodiment

Figure 8:
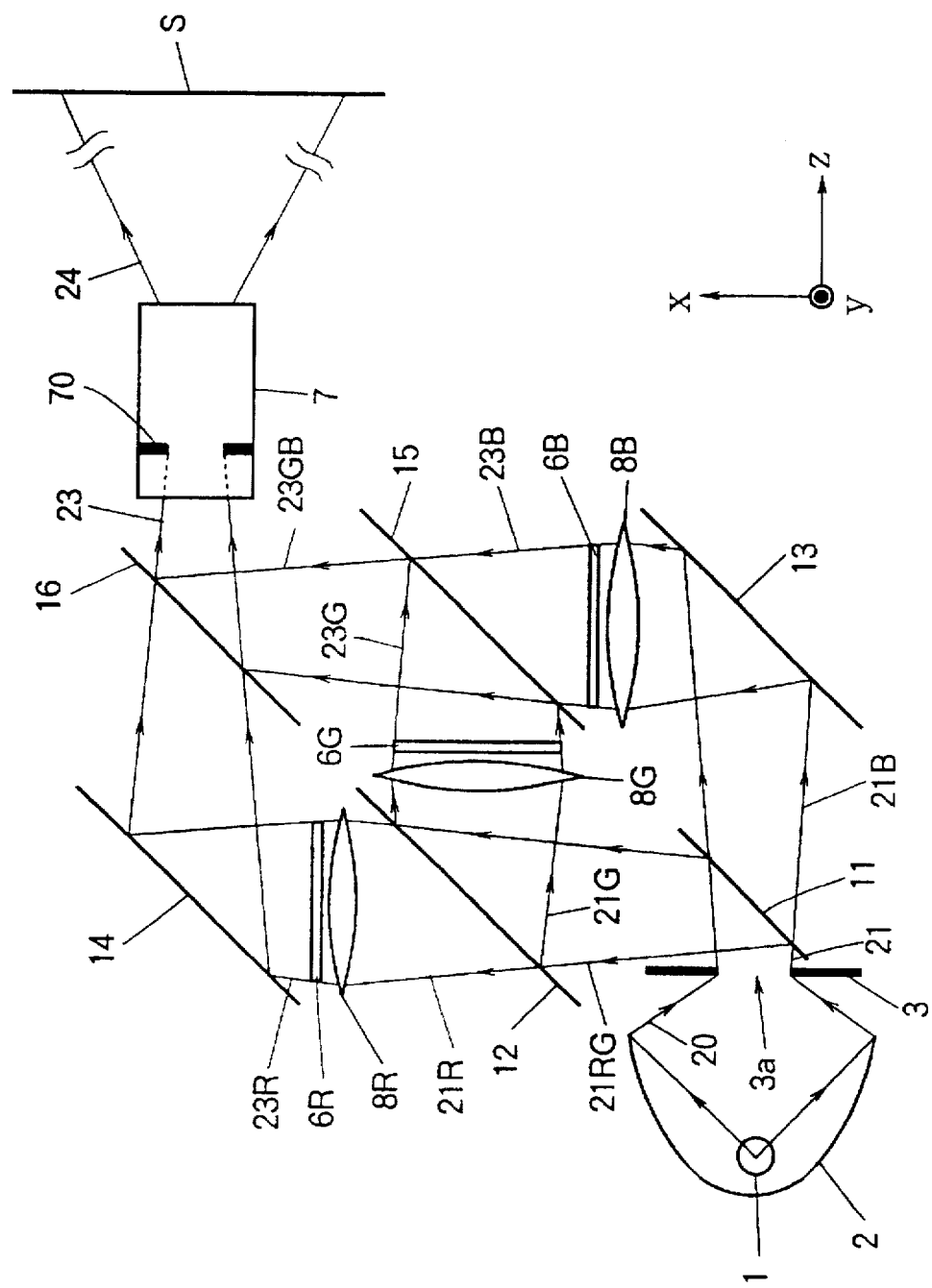
FIG. 8 is a schematic view showing an optical system of a projection-type display apparatus according to a fifth embodiment of the present invention.

FIG. 8 is a schematic view showing an optical system of a projection-type display apparatus according a fifth embodiment of the present invention. In FIG. 8, the construction which are identical or corresponding to those of FIG. 1 are denoted by the same symbols. The projection-type display apparatus of the fifth embodiment differs from that of the first embodiment (FIG. 1) in that the condenser lenses 4B, 4RG and condenser lenses 5R, 5G and 5B disposed in the vicinity of the liquid crystal light valves shown in FIG. 1 are replaced by the condenser lenses 8R, 8G and 8B as shown in FIG. 8 and the reflecting mirror 10 is not provided.

According to the fifth embodiment, after the light emerging from the lamp 1 is reflected by the ellipsoidal mirror 2 and transmitted through the aperture 3a of the diaphragm 3 disposed in the vicinity of the secondary focus, the blue beam 21B is transmitted, and the red and green beam 21RG is reflected, by the first color separating dichroic mirror 11. Of the red and green beam 21RG which is a divergent beam, the red beam 21R is transmitted and the green beam 21G is reflected by the second color separating dichroic mirror 12. The divergent beams 21R, 21G and 21B are respectively converted to convergent beams 23R, 23G and 23B by the condenser lenses 8R, 8G and 8B.

According to the fifth embodiment, as the first and second color separating dichroic mirrors 11 and 12 and the reflecting mirror 13 are disposed in the optical path of the divergent beam 21 from the diaphragm 3, the shared optical path length can be made even longer than in the case of the above-mentioned first embodiment, hence the optical system occupies less space and the apparatus can be made more compact and lightweight. The remaining points of the fifth embodiment are identical to those of the above-mentioned first embodiment.

Sixth Embodiment

Figure 9:
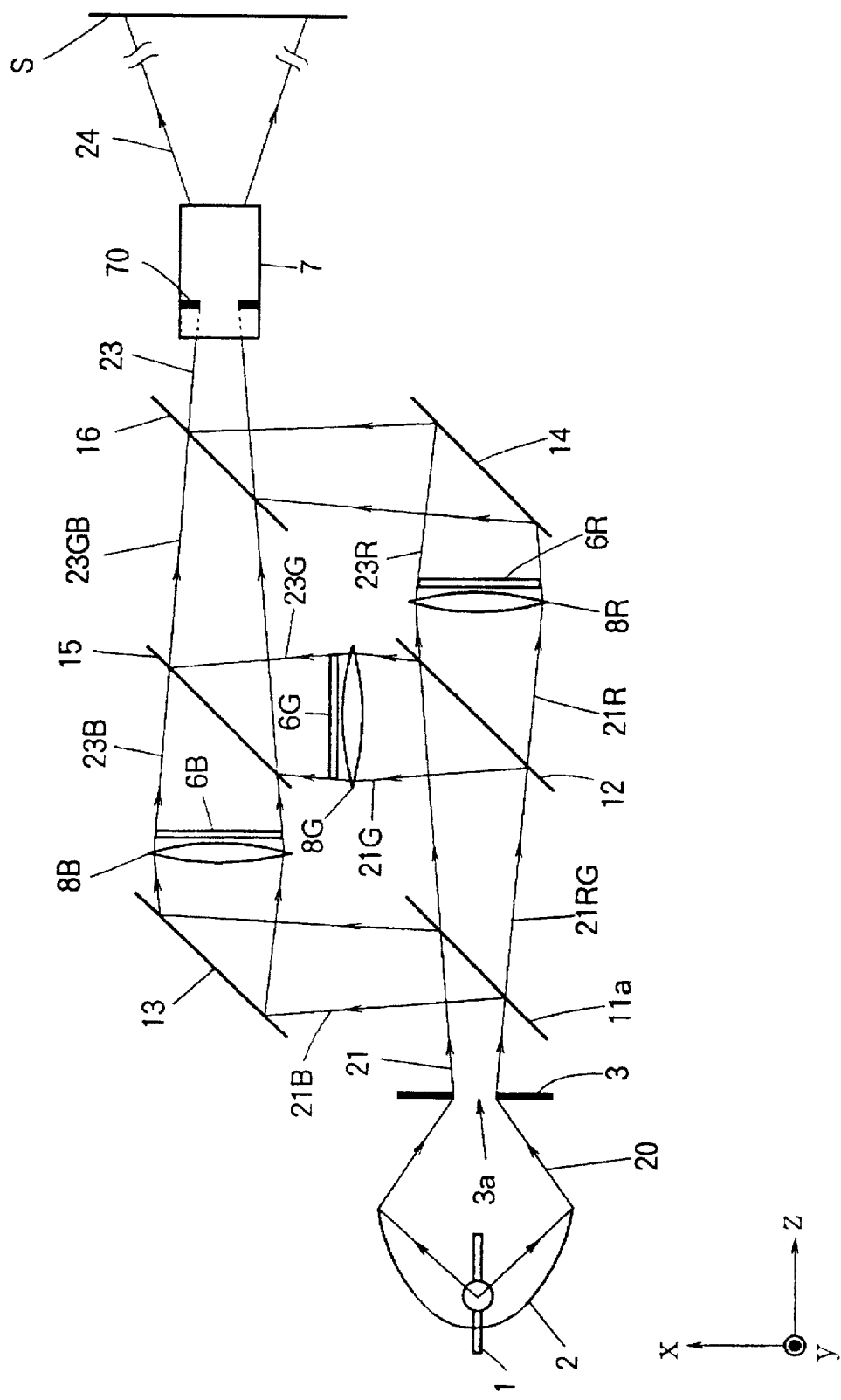
FIG. 9 is a schematic view showing an optical system of a projection-type display apparatus according to a sixth embodiment of the present invention.

FIG. 9 is a schematic view showing an optical system of a projection-type display apparatus according to a sixth embodiment of the present invention. In FIG. 9, the construction which are identical or corresponding to those of FIG. 8 are denoted by the same symbols. The projection-type display apparatus according to the sixth embodiment differs from the fifth embodiment in the characteristics of the first color separating dichroic mirror 11a and the arrangement of components.

According to the above-mentioned fifth embodiment, the first color separating dichroic mirror 11 transmits the blue component of the light and reflects the red and green components (i.e., the components other than blue), however, the first color separating dichroic mirror 11a of the sixth embodiment reflects the blue component and transmits the red and green components (i.e., the components other than blue). Also, in the optical system of the fifth embodiment, the two mirrors (for example, 11 and 13) are disposed in the z direction and the three mirrors (for example, 11, 12 and 14) are disposed in the x direction, as shown in FIG. 8, however, in the optical system of the sixth embodiment, the three mirrors (for example, 11a, 12 and 14) are disposed in the z direction and the two stage mirror (for example, 11a, 13) is disposed in the x direction, as shown in FIG. 9. If the short sides of the image display areas of the liquid crystal light valves 6R, 6G and 6B are arranged parallel to the xz plane, the x direction is the height direction of the apparatus, hence the height of the apparatus can be made lower in the case of the sixth embodiment than in that of the fifth embodiment. The remaining points of the sixth embodiment are the same as those of the above-mentioned fifth embodiment.

Seventh Embodiment

Figure 10:
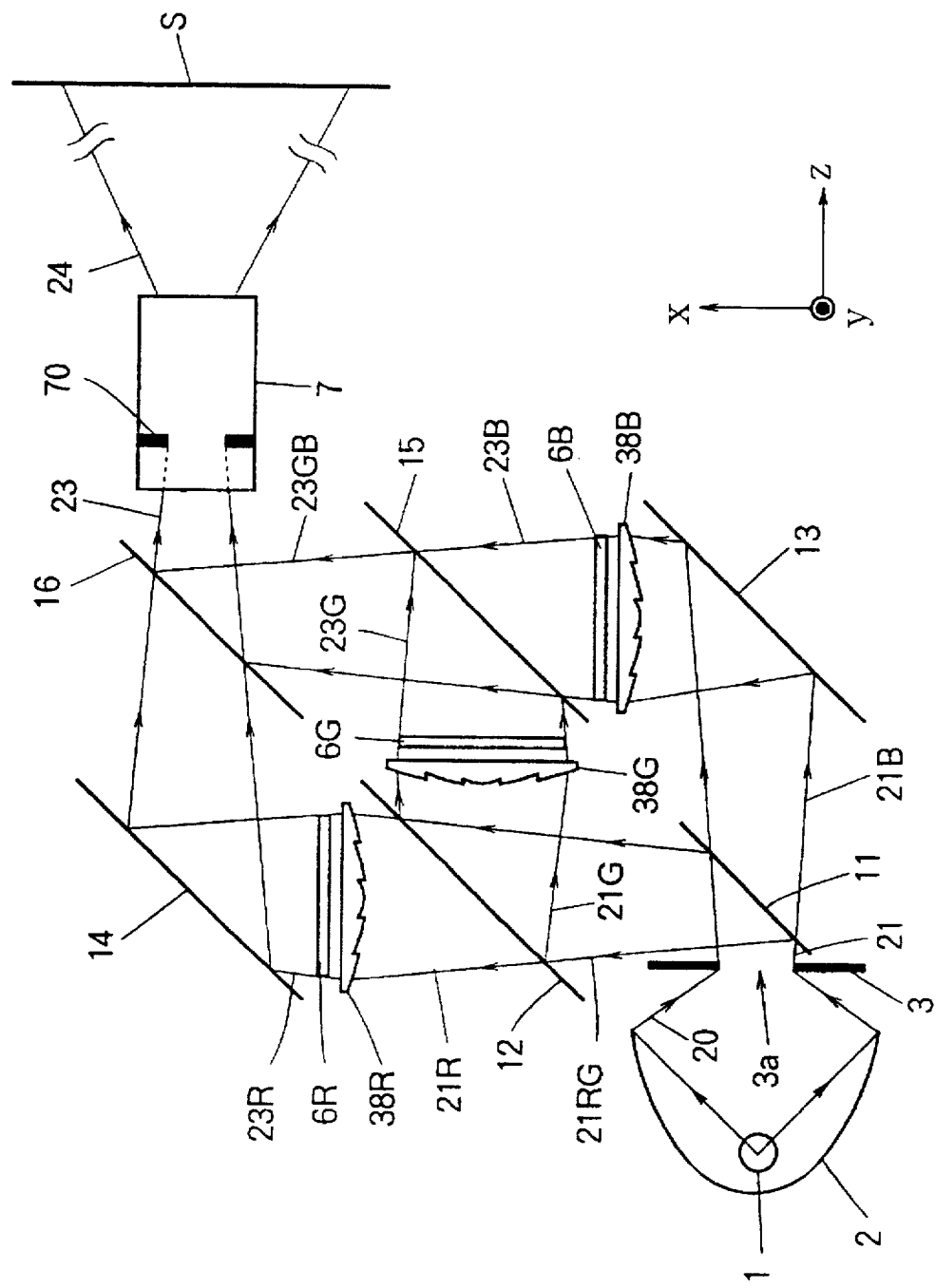
FIG. 10 is a schematic view showing an optical system of a projection-type display apparatus according to a seventh embodiment of the present invention.

FIG. 10 is a schematic view showing an optical system of a projection-type display apparatus according to a seventh embodiment of the present invention. In FIG. 10, the construction which are identical or corresponding to those of FIG. 8 are denoted by the same symbols. As shown in FIG. 10, the projection-type display apparatus according to the seventh embodiment differs from that of the above-mentioned fifth embodiment (FIG. 8) only in that the condenser lenses 8R, 8G and 8B of FIG. 8 are respectively replaced by Fresnel lenses 38R, 38G and 38B.

Figure 11A:
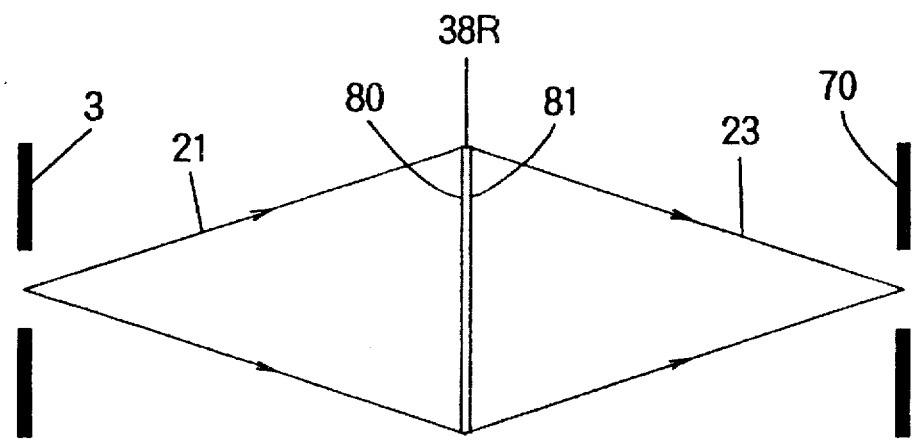
FIGS. 11A and 11B are explanatory diagrams showing a function of the Fresnel lens 38R in FIG. 10.
Figure 11B:
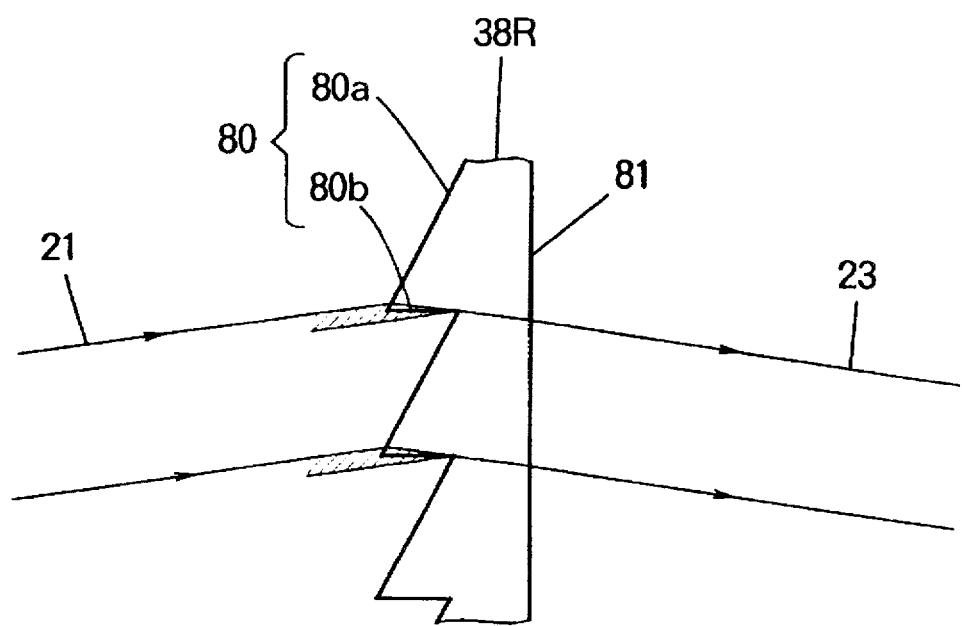

The Fresnel lenses 38R, 38G and 38B shown in FIG. 10 are made of glass or plastic, and have a flat (or curved) surface 81 and a Fresnel surface 80 having ring-like or circular steps. In the seventh embodiment, as shown in FIG. 10 and FIGS. 11A and 11B, the flat surface 81 (Although FIG. 11B shows the Fresnel lens 38R, the Fresnel lenses 38G and 38B have the same construction.) faces the liquid crystal light valves 6R, 6G and 6B. In other words, the Fresnel surface 80 faces the divergent beam 21 (i.e., 21R, 21G and 21B in FIG. 10), and the flat surface 81 faces the convergent beam 23 (i.e., 23R, 23G and 23B in FIG. 10). This is because if the Fresnel surface 80 is arranged facing the divergent beam 23, Fresnel stripes are easy to appear and images of the liquid crystal light valves 6R, 6G and 6B may be projected on the screen together with the Fresnel stripes.

As described hereinbefore, according to the seventh embodiment, the apparatus can be made more compact and lightweight for the same reasons as in the case of the fifth embodiment. Further, according to the seventh embodiment, the lenses can be made more compact and lightweight. If the lenses are made of plastic, low-cost lenses which are easy to mass produce can be manufactured by a technique such as compression molding or injection molding, and the cost of the apparatus can be reduced.

As shown in FIGS. 11A and 11B, in the seventh embodiment, the surface 81 opposite the Fresnel surface 80 of the Fresnel lens 38R, 38G and 38B are shown flat, however, the surfaces 81 may also be convex curved surfaces in order to increase lens power. The Fresnel surfaces 80 may also comprise steps formed on a curved surface. In this case too, light losses may be suppressed by arranging the Fresnel surface 80 of the Fresnel lens 38R facing the divergent beam 21, and the projection of Fresnel stripes may be suppressed.

Figure 12A:
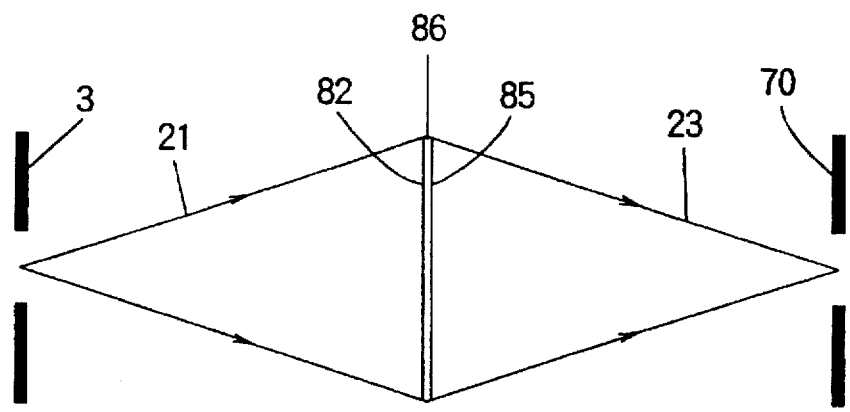
FIGS. 12A and 12B are explanatory diagrams showing a function of a pair of Fresnel lenses employed in another aspect of the seventh embodiment.
Figure 12B:
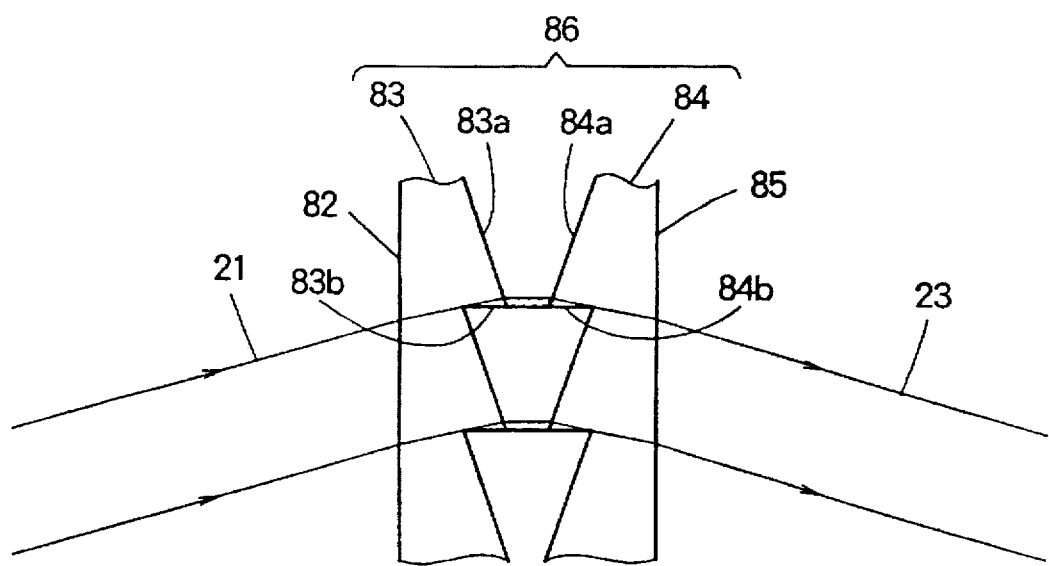

As shown in FIGS. 12A and 12B, the condenser lenses 38R, 38G and 38B each may comprise a pair of Fresnel lenses 83 and 84 with the same Fresnel pitch, each of these component lenses having a flat surface and a Fresnel surface, and the Fresnel surfaces 83a and 84a facing each other. If this lens pair is used, the light beam 21 transmitted through the first Fresnel lens 83 does not suffer any loss at the boundary surface 83b of the inclined surface 83a, although a shadow is produced. After the light is transmitted through the inclined surface 84a of the second Fresnel surface 84, however, as the area of this shadow coincides with the area incident on the boundary surface 84b, the shadow disappears from the convergent beam 23. The condenser lenses 38R, 38G and 38B in this arrangement therefore have a high transmittance and do not give rise to Fresnel stripes. Further, the surfaces 82 and 85 may be convex curved surfaces in order to increase the lens power. The remaining points of the seventh embodiment are the same as those of the above-mentioned fifth embodiment.

Eighth Embodiment

Figure 13:
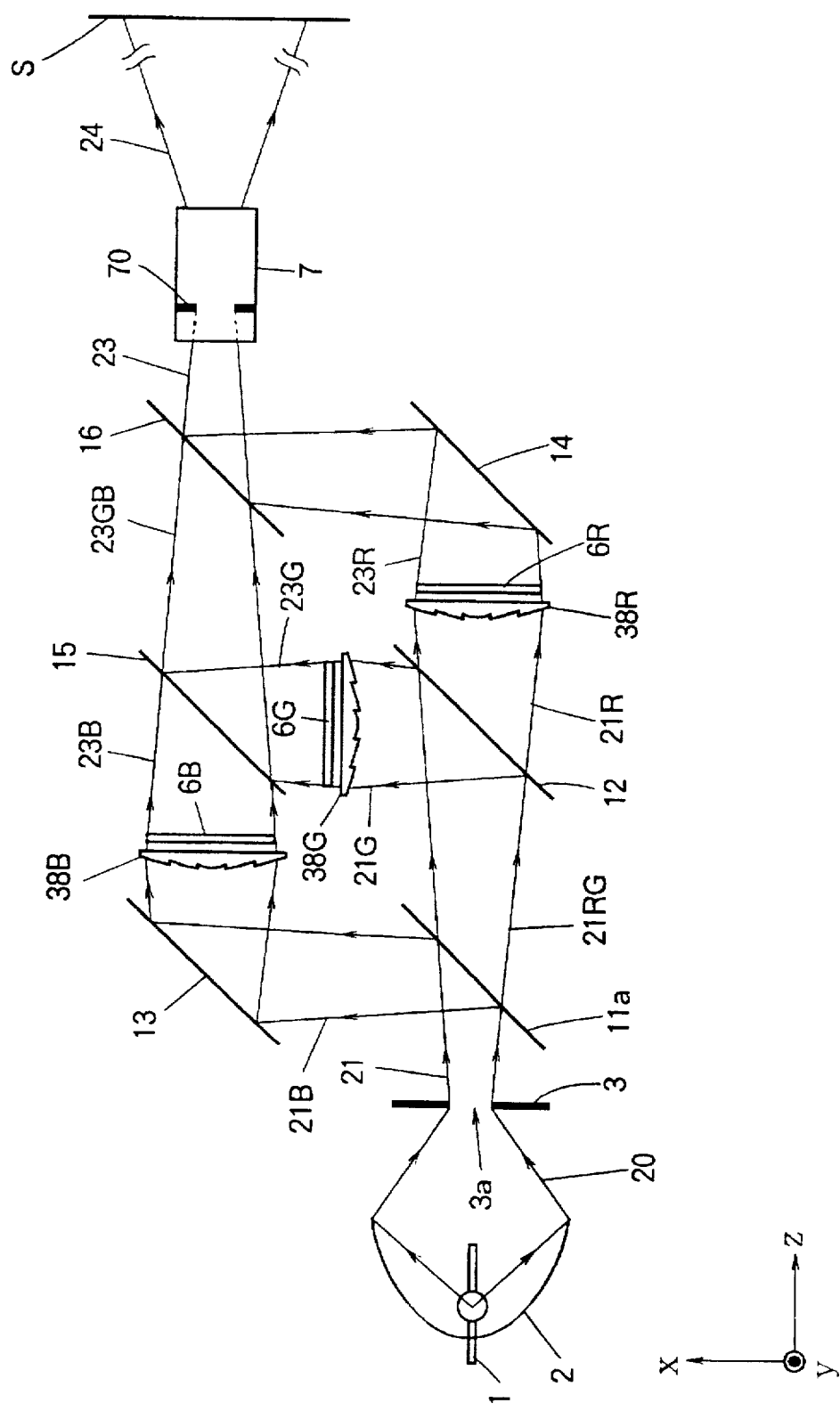
FIG. 13 is a schematic view showing an optical system of a projection-type display apparatus according to a eighth embodiment of the present invention.

FIG. 13 is a schematic view showing an optical system of a projection-type display apparatus according to an eighth embodiment of the present invention. In FIG. 13, the construction which are identical or corresponding to those of FIG. 10 are denoted by the same symbols. The projection-type display apparatus according to the eighth embodiment differs from that of the above-mentioned seventh embodiment (FIG. 10) in the characteristics of the first color separating dichroic mirror 11a and the arrangement of components.

The first color separating dichroic mirror 11 of the above-mentioned seventh embodiment transmits the blue component of the light and reflected the red and green components (i.e., the components other than blue), however, the first color separating dichroic mirror 11a of the eighth embodiment reflects the blue component and transmits the red and green components (i.e., the components other than blue). Also, in the optical system of the above-mentioned seventh embodiment, the two mirrors (for example, 11 and 13) are disposed in the z direction and the three mirrors (for example, 11, 12 and 14) are disposed in the x direction, as shown in FIG. 10. However, in the optical system of the eighth embodiment, the three mirrors (for example, 11a, 12 and 14) are disposed in the z direction and the two mirrors (for example, 11a and 13) are disposed in the x direction, as shown in FIG. 13. If the short sides of the image display areas of the light valves 6R, 6G and 6B are arranged parallel to the xz plane, the x direction is the height direction of the apparatus, hence the height of the apparatus can be made lower in the case of the eighth embodiment than in that of the seventh embodiment. The remaining points of the eighth embodiment are the same as those of the seventh embodiment.

Ninth Embodiment

Figure 14:
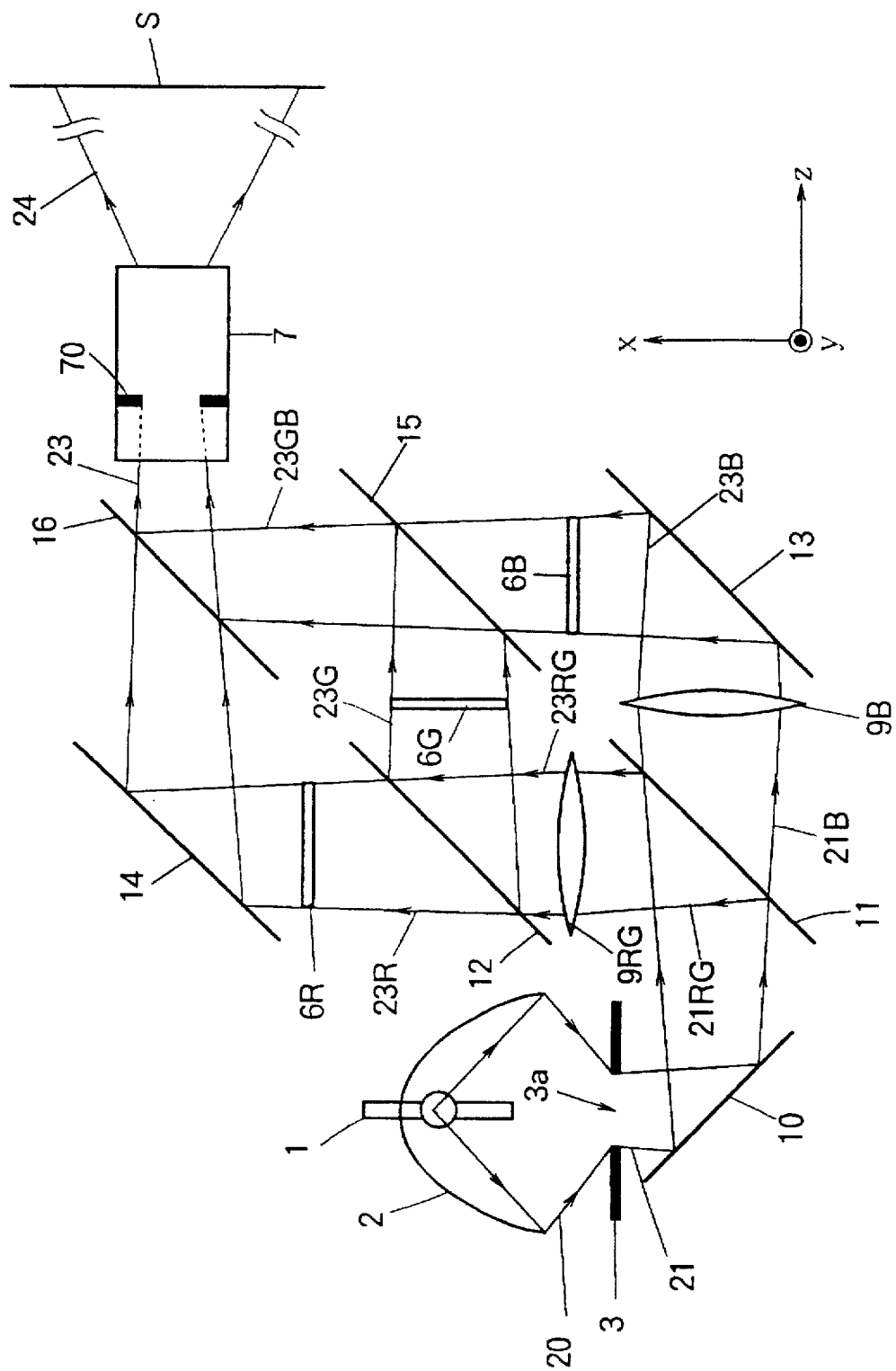
FIG. 14 is a schematic view showing an optical system of a projection-type display apparatus according to a ninth embodiment of the present invention.

FIG. 14 is a schematic view showing an optical system of a projection-type display apparatus according to a ninth embodiment of the present invention. In FIG. 14, the construction which is identical or corresponding to those of FIG. 1 are denoted by the same symbols. The projection-type display apparatus according to the ninth embodiment differs from that of the above-mentioned first embodiment (FIG. 1) in that as can be seen in FIG. 14, the condenser lenses 4B and 4RG shown in FIG. 1 are replaced by condenser lenses 9B and 9RG, and no condenser lens is disposed in the vicinity of the liquid crystal light valves 6R, 6G and 6B.

According to the ninth embodiment, after the light 20 emitted by the lamp 1 is reflected by the ellipsoidal mirror 2 and it is transmitted through the aperture 3a of the diaphragm disposed in the vicinity of the secondary focus of the ellipsoidal mirror 2, the blue beam 21B is transmitted through the first color separating dichroic mirror 11 whereas the red and green beam 21RG is reflected. The divergent beams 21RG and 21B are respectively converted to convergent beams by the condenser lenses 9RG and 9B. Of the red and green beam 23RG which is a convergent beam, the red beam 23R is transmitted through the second color separating dichroic mirror 12 and the green beam 23G is reflected.

According to the ninth embodiment, as in the case of the above-mentioned first embodiment, a long shared optical path length can be obtained, hence the space occupied by the optical system can be reduced and the whole apparatus can be made compact and lightweight. Further, according to the ninth embodiment, the liquid crystal light valves 6R, 6G and 6B can be disposed in more highly converging beams than in the case of the above-mentioned first to eighth embodiments, hence the optical system is suited to smaller liquid crystal light valves. The remaining points of the ninth embodiment are identical to those of the above-mentioned first embodiment.

Tenth Embodiment

Figure 15:
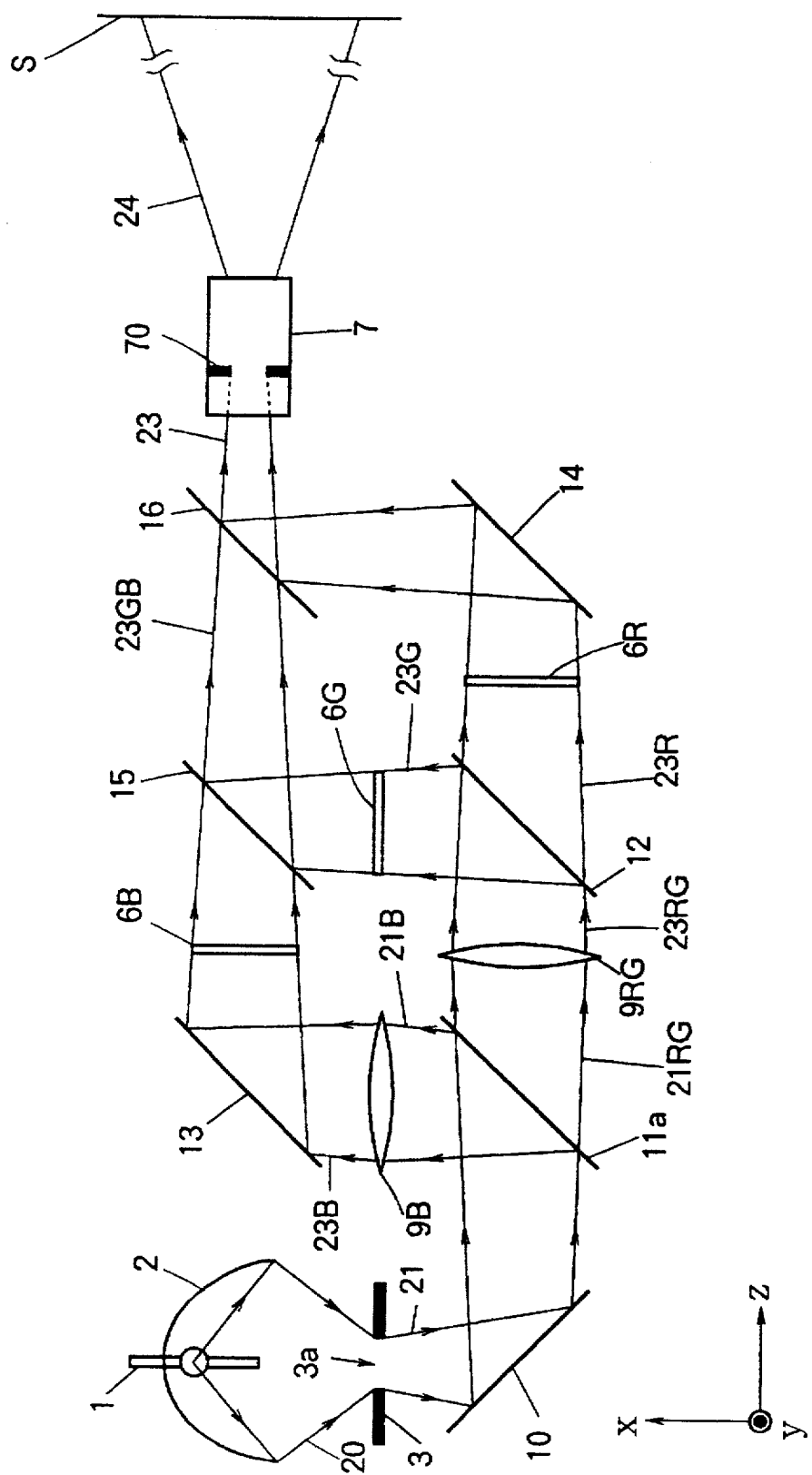
FIG. 15 is a schematic view showing an optical system of a projection-type display apparatus according to a tenth embodiment of the present invention.

FIG. 15 is a schematic view showing an optical system of a projection-type display apparatus according to a tenth embodiment of the present invention. In FIG. 15, the construction which is identical or corresponding to those of FIG. 14 are denoted by the same symbols. The projection-type display apparatus according to the tenth embodiment differs from that of the ninth embodiment (FIG. 14) in the characteristics of the first color separating dichroic mirror 11a and the disposition of the other components.

According to the above-mentioned ninth embodiment, the first color separating dichroic mirror 11 transmits the blue component of the light and reflected the red and green components (i.e., the components other than blue). However, the first color separating dichroic mirror 11a according to the tenth embodiment reflects the blue component of the light and transmits the red and green components (i.e., the components other than blue). Also, in the optical system according to the ninth embodiment, the two mirrors (for example, 11 and 13) are disposed in the z direction and the three mirrors (for example, 11, 12 and 14) are disposed in the x direction as shown in FIG. 14, however, in the optical system of the tenth embodiment, the three mirrors (for example, 11a, 12 and 14) are disposed in the z direction and the two mirrors (for example, 11a and 13) are disposed in the x direction as shown in FIG. 15. If the short sides of the image display areas of the light valves 6R, 6G and 6B are arranged parallel to the xz plane, the x direction is the height direction of the apparatus, hence the height of the apparatus can be made lower in the case of the tenth embodiment than in that of the ninth embodiment. The remaining points of the tenth embodiment are the same as those of the ninth embodiment.

Eleventh Embodiment

Figure 16:
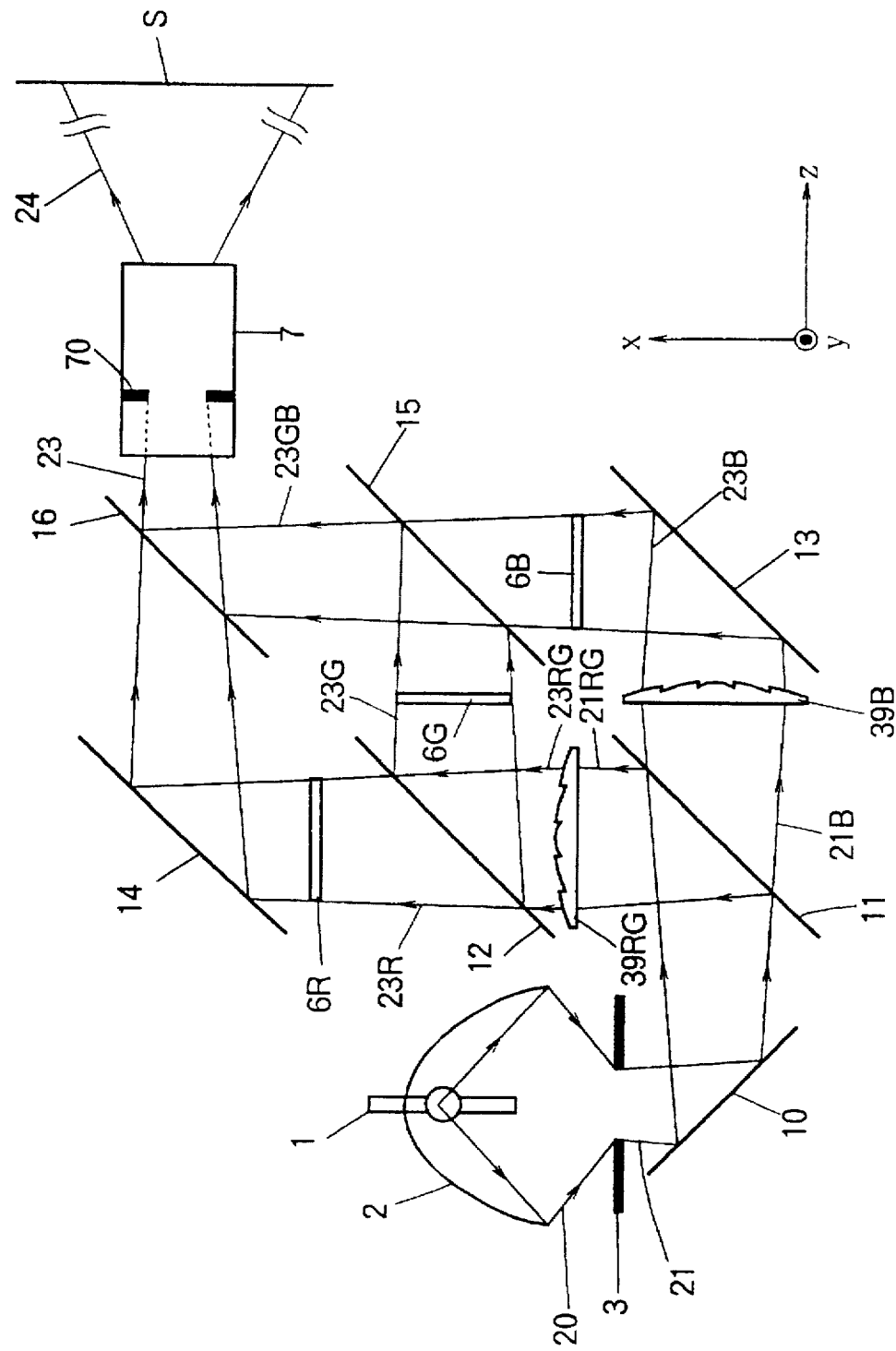
FIG. 16 is a schematic view showing an optical system of a projection-type display apparatus according to an eleventh embodiment of the present invention.

FIG. 16 is a schematic view showing an optical system of a projection-type display apparatus according to an eleventh embodiment of the present invention. In FIG. 16, the construction which is identical or corresponding to those of FIG. 14 are denoted by the same symbols. The projection-type display apparatus according to the eleventh embodiment differs from that of the ninth embodiment (FIG. 14) only in that the condenser lenses 9RG and 9B of the above-mentioned ninth embodiment are respectively replaced by Fresnel lenses 39RG and 39B, as shown in FIG. 16.

Figure 17A:
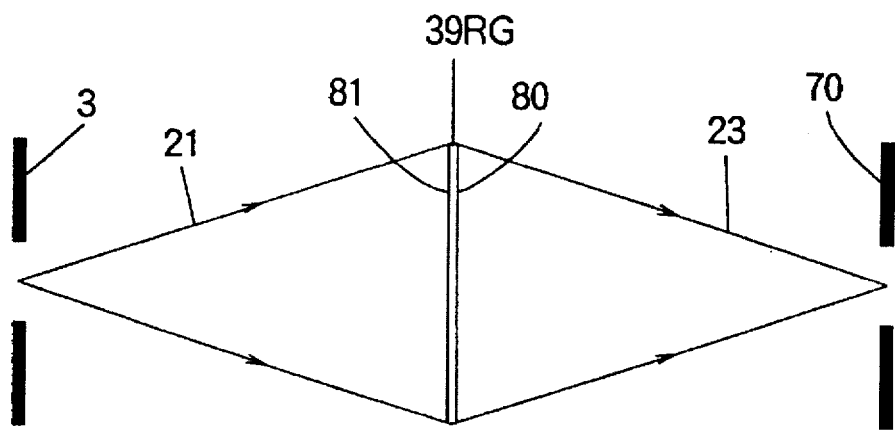
FIGS. 17A and 17B are explanatory diagrams showing a function of the Fresnel lens 39RG in FIG. 16.
Figure 17B:
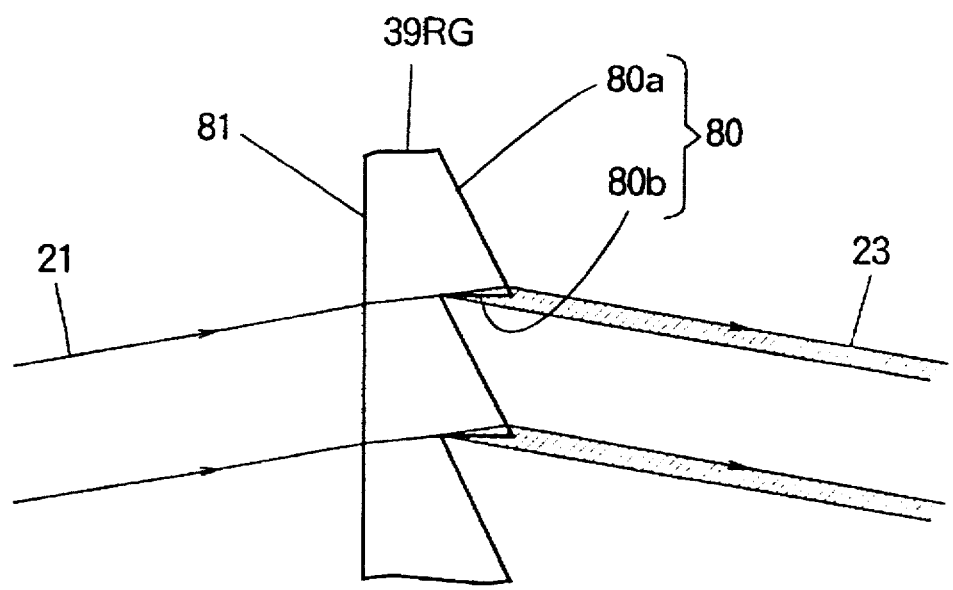

The Fresnel lenses 39RG and 39B shown in FIG. 16 are made of glass or plastic, and have a flat (or curved) surface 81 and a Fresnel surface 80 having ring-like or circular steps. In the eleventh embodiment, as shown in FIG. 16 and FIGS. 17A and 17B, the flat surface 81 (Although FIG. 17 shows the Fresnel lens 39RG, the Fresnel lens 39B has the same construction) faces the first color separating dichroic mirror 11. In other words, the Fresnel surface 80 faces the convergent beam 23 (i.e., 23RG and 23B in FIG. 16), and the flat surface 81 faces the divergent beam 21 (i.e., 21RG and 21B in FIG. 16). This is in order to suppress losses of the incident beam to a low level.

As described hereinbefore, according to the eleventh embodiment, the apparatus can be made more compact and lightweight for the same reasons as in the case of the ninth embodiment. Further, according to the eleventh embodiment, the lenses can be made more compact and lightweight. If the lenses are made of plastic, low-cost lenses which are easy to mass produce can be manufactured by a technique such as compression molding or injection molding, and the cost of the apparatus can be reduced.

In FIGS. 17A and 17B, the surfaces opposite the Fresnel surfaces of the Fresnel lenses 39B and 39RG are shown flat, however, they may also be convex curved surfaces in order to increase lens power. The Fresnel surfaces may also comprise Fresnel stripes formed on a convex curved surface.

The condenser lenses 39B and 39RG may each comprise a pair of Fresnel lenses 83 and 84 with the same Fresnel pitch, each of these component lenses having a flat surface and a Fresnel surface, and the Fresnel surfaces 83a and 84a facing each other, as shown in FIGS. 12A and 12B. The remaining points of the eleventh embodiment are the same as those of the above-mentioned ninth embodiment.

Twelfth Embodiment

Figure 18:
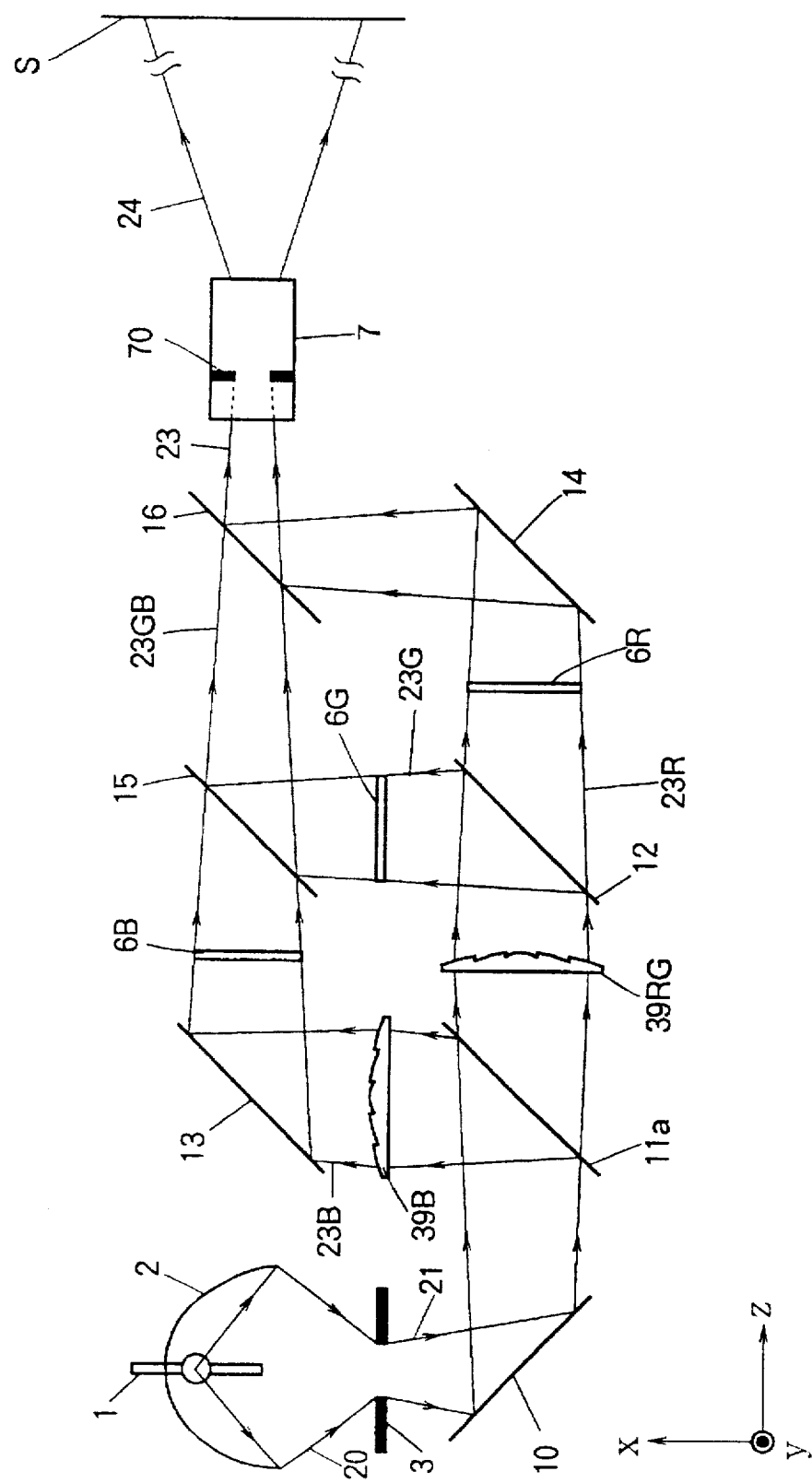
FIG. 18 is a schematic view showing an optical system of a projection-type display apparatus according to a twelfth embodiment of the present invention.

FIG. 18 is a schematic view showing an optical system of a projection-type display apparatus according to a twelfth embodiment of the present invention. In FIG. 18, the construction which is identical or corresponding to those of the eleventh embodiment (FIG. 16) are denoted by the same symbols. The projection-type display apparatus according to the twelfth embodiment differs from that of the eleventh embodiment in the characteristics of the first color separating dichroic mirror 11a and the arrangement of components.

The first color separating dichroic mirror 11 of the the above-mentioned eleventh embodiment transmits the blue component of the light and reflected the red and green components (i.e., the components other than blue), however, the first color separating dichroic mirror 11a of the twelfth embodiment reflects the blue component and transmits the red and green components (i.e., the components other than blue). Also, in the optical system of the twelfth embodiment, the two mirrors (for example, 11 and 13) are disposed in the z direction and the three mirrors (for example, 11, 12 and 14) are disposed in the x direction as shown in FIG. 16, however, in the optical system of the twelfth embodiment, the three mirrors (for example, 11a, 12 and 14) are disposed in the z direction and the two mirrors (for example, 11a and 13) are disposed in the x direction as shown in FIG. 18. If the short sides of the image display areas of the light valves 6R, 6G and 6B are arranged parallel to the xz plane, the x direction is the height direction of the apparatus, hence the height of the apparatus can be made lower in the case of the twelfth embodiment than in that of the eleventh embodiment. The remaining points of the twelfth embodiment are the same as those of the eleventh embodiment.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A projection-type display apparatus comprising:

a lamp for emitting light:

an ellipsoidal mirror for converging the light emitted by said lamp:

a diaphragm disposed in the vicinity of a secondary focus of said ellipsoidal mirror:

first color separating means, which directly receives divergent light which has been transmitted through an aperture of said diaphragm and has not passed though a convergent lens, for separating the light transmitted through said aperture of said diaphragm into a first beam having wavelengths within a first wavelength region and a beam having wavelengths outside said first wavelength region;

second color separating means for separating said beam having wavelengths outside said first wavelength region into a second beam having wavelengths within a second wavelength region and a third beam having wavelengths outside said second wavelength region;

first, second, and third light valves for displaying images respectively corresponding to said first, second, and third beams;

first lens means, disposed downstream in a light propagation direction from said first color separating means, for causing said first, second, and third beams which respectively advance toward said first, second, and third light valves to be convergent beams;

color synthesizing means for synthesizing said first, second, and third beams which have been transmitted through said first, second, and third light valves respectively, thereby generating a synthesized beam; and a projection lens for enlarging and projecting said synthesized beam onto a screen.

2. A projection-type display apparatus of claim 1, wherein said first lens means includes:

first and second lenses each for converging a divergent beam resulting from said first color separating means, each of which is disposed in the vicinity of and downstream in the light propagation direction from said first color separating means.

3. A projection-type display apparatus of claim 1, wherein said first lens means includes:

first, second, and third lenses each for converging a divergent beam, each of which is respectively disposed in the vicinity of said first, second, and third light valves.

4. A projection-type display apparatus of claim 1, wherein said first lens means includes convex lenses.

5. A projection-type display apparatus of claim 1, wherein said first lens means includes Fresnel lenses.

6. A projection-type display apparatus of claim 2, wherein said first lens means includes Fresnel lenses each having a first surface which is flat or curved and a second surface which has a plurality of ring-like steps, said first surface each facing said first color separating means.

7. A projection-type display apparatus of claim 3, wherein said first lens means includes Fresnel lenses each having a first surface which has a plurality of ring-like steps and a second surface which is flat or curved, said second surface each respectively facing said first, second, and third light valves.

8. A projection-type display apparatus of claim 2, wherein said first lens means includes pairs of a first Fresnel lens and a second Fresnel lens, said first Fresnel lens having a first surface which is flat or curved and a second surface which has a plurality of ring-like steps, said second Fresnel lens having a first surface which has a plurality of ring-like steps and a second surface which is flat or curved, and said second surface of said first Fresnel lens and said first surface of said second Fresnel lens being arranged facing each other.

9. A projection-type display apparatus of claim 1, further comprising a conical or pyramid-shaped lens disposed in the vicinity of the secondary focus of said ellipsoidal mirror.

10. A projection-type display apparatus comprising:

a lamp for emitting light;

an ellipsoidal mirror for converging the light emitted by said lamp;

a diaphragm disposed in the vicinity of a secondary focus of said ellipsoidal mirror;

first color separating means, which directly receives divergent light which has been transmitted through an aperture of said diaphragm and has not passed through a convergent lens, for separating the light transmitted through said aperture of said diaphragm into a first beam having wavelengths within a first wavelength region and a beam having wavelengths outside said first wavelength region;

second color separating means for separating said beam having wavelengths outside said first wavelength region into a second beam having wavelengths within a second wavelength region and a third beam having wavelengths outside said second wavelength region;

first, second, and third light valves for displaying images respectively corresponding to said first, second, and third beams;

first lens means, disposed downstream in a light propagation from said first color separating means, for causing said first, second, and third beams which respectively advance toward said first, second, and third light valves to be parallel beams;

color synthesizing means for synthesizing said first, second, and third beams which have been transmitted through said first, second, and third light valves respectively, thereby generating a synthesized beam; and a projection lens for enlarging and projecting said synthesized beam onto a screen.

11. A projection type display apparatus of claim 10, wherein said first lens means includes:

first and second lenses each for making parallel a divergent beam resulting from said first color separating means, each of which is disposed in the vicinity of and downstream in the light propagation direction from said first color separating means.

12. A projection-type display apparatus of claim 10, wherein said first lens means includes convex lenses.

13. A projection-type display apparatus of claim 10, wherein said first lens means includes Fresnel lenses.

14. A projection-type display apparatus of claim 11, wherein said first lens means includes Fresnel lenses each having a first surface which is flat or curved and a second surface which has a plurality of ring-like steps, said first surface each facing said first color separating means.

15. A projection-type display apparatus of claim 11, wherein said first lens means includes pairs of a first Fresnel lens and a second Fresnel lens, said first Fresnel lens having a first surface which is flat or curved and a second surface which has a plurality of ring-like steps, said second Fresnel lens having a first surface which has a plurality of ring-like steps and a second surface which is flat or curved, and said second surface of said first Fresnel lens and said first surface of said second Fresnel lens surfaces being arranged facing each other.

16. A projection-type display apparatus of claim 10, further comprising:

a conical or pyramid-shaped lens disposed in the vicinity of the secondary focus of said ellipsoidal mirror.

17. A projection-type display apparatus of claim 10, further comprising second lens means disposed in the vicinity of said first, second and third light valves.

18. A projection-type display apparatus of claim 17, wherein said second lens means includes convex lenses.

19. A projection-type display apparatus of claim 17, wherein said second lens means includes Fresnel lenses.

20. A projection-type display apparatus of claim 17, wherein said second lens means includes Fresnel lenses each having a first surface which has a plurality of ring-like steps and a second surface which is flat or curved, said second surface each respectively facing said first, second, and third light valves.

* * * * *